UNITED STATES PATENT OFFICE.

ALBERT BITZA, OF ST. LOUIS, MISSOURI.

FOOD PRODUCT AND PROCESS OF MAKING SAME.

No. 795,756.     Specification of Letters Patent.     Patented July 25, 1905.

Application filed December 20, 1904. Serial No. 237,723.

*To all whom it may concern:*

Be it known that I, ALBERT BITZA, a citizen of the United States, and a resident of the city of St. Louis, State of Missouri, have invented certain new and useful Improvements in Food Products and Processes of Making Same, of which the following is a specification containing a full, clear, and exact description.

My invention relates to an improved food product; and it consists in the novel process and product herein described and claimed.

In carrying out my invention I take a quantity of what are commercially known as "string-beans" in the form in which they are just stripped from the vines and first "string" them by taking a small piece off of each end, so that the string will adhere to such pieces and be stripped off the body of the bean-pod. Then I run the stringless pods through a suitable common shredding-machine fitted with rotary disk cutters, between which the pods are run endwise, thereby reducing them lengthwise to shreds or narrow strips. However, I may make use of any other common "slicing-machine" which will reduce the pods lengthwise to narrow strips. A number of said slicing-machines such as have been described are now on the market and may be purchased in hardware-stores. In passing the pods through the machine many of the seeds fall out; but others are cut into pieces and are rolled up within the strips during the operation next mentioned herein. Then the strips or shreds are placed upon a table and subjected to the action of currents of warm air, and simultaneously therewith they are rolled beneath the operator's hands, compelling them to assume a sort of twisted tubular form. Finally the shreds or strips are placed in an oven or common evaporator and thoroughly dried. After being thus dried the strips assume substantially a spiral-like shape.

The food product thus produced may be quickly prepared for the table by simply allowing it to soak in cold water for a few minutes and then boiling the same until properly cooked. The operation of soaking and cooking causes the shreds or strips to absorb the water and become enlarged to almost their original size.

What I claim is—

1. The herein-described food product, comprising green bean-pods divested of the strings, and reduced lengthwise to shreds or narrow strips, rolled into a twisted tubular form lengthwise of the pods, and dried so that they assume substantially a spiral-like shape; substantially as specified.

2. The herein-described process of preparing a food product from green bean-pods, consisting in first stripping the strings from the pods, then reducing the pods lengthwise to the form of narrow strips, and simultaneously drying and rolling the same into twisted tubular form so that they assume substantially a spiral-like shape; substantially as specified.

3. The herein-described process of preparing a food product from green bean-pods, consisting in first stripping the strings from the pods, then reducing the pods lengthwise to the form of narrow strips, rolling the same into a twisted tubular form, then drying the strips, so that they assume substantially a spiral-like shape and finally soaking the tubular bodies in water preparatory to cooking the same; substantially as specified.

In testimony whereof I have signed my name to this specification in presence of two subscribing witnesses.

ALBERT BITZA.

Witnesses:
     ALFRED A. EICKS,
     JOHN C. HIGDON.